US008768947B2

(12) United States Patent
Franz

(10) Patent No.: US 8,768,947 B2
(45) Date of Patent: Jul. 1, 2014

(54) SYSTEM AND METHOD FOR IMPLEMENTING UNIQUE PRIMARY KEYS ACROSS ENTERPRISE DATABASES

(75) Inventor: Joern Amand Franz, Kriftel (DE)

(73) Assignee: AT&T Global Network Services Deutschland GmbH, Frankfurt am Main (DE)

( * ) Notice: Subject to any disclaimer, the term of this patent is extended or adjusted under 35 U.S.C. 154(b) by 434 days.

(21) Appl. No.: 12/645,282

(22) Filed: Dec. 22, 2009

(65) Prior Publication Data

US 2011/0153679 A1 Jun. 23, 2011

(51) Int. Cl.
*G06F 7/00* (2006.01)
*G06F 17/30* (2006.01)
(52) U.S. Cl.
USPC .......................................... 707/759
(58) Field of Classification Search
USPC .......................................... 707/757
See application file for complete search history.

(56) References Cited

U.S. PATENT DOCUMENTS

| 5,586,330 A | 12/1996 | Knudsen et al. | |
|---|---|---|---|
| 7,574,413 B2* | 8/2009 | Larson et al. | 706/47 |
| 7,680,767 B2 | 3/2010 | Adya et al. | |
| 7,693,900 B2 | 4/2010 | Wilmering et al. | |
| 7,809,741 B2* | 10/2010 | Hays et al. | 707/758 |
| 7,941,785 B2* | 5/2011 | Cole | 717/120 |
| 2002/0093857 A1* | 7/2002 | Cole | 365/200 |
| 2004/0230571 A1 | 11/2004 | Robertson | |
| 2005/0149555 A1* | 7/2005 | Wang et al. | 707/103 R |
| 2006/0101097 A1* | 5/2006 | Barboi et al. | 707/204 |
| 2006/0173865 A1 | 8/2006 | Fong | |
| 2007/0233718 A1* | 10/2007 | Hays et al. | 707/101 |
| 2008/0046462 A1* | 2/2008 | Kaufman et al. | 707/102 |
| 2008/0059514 A1* | 3/2008 | Ackerman et al. | 707/102 |
| 2008/0104008 A1* | 5/2008 | Brantley et al. | 707/1 |
| 2008/0215968 A1 | 9/2008 | Bekerman | |
| 2008/0294664 A1* | 11/2008 | Ackerman et al. | 707/100 |
| 2010/0114962 A1* | 5/2010 | Ahadian et al. | 707/782 |
| 2011/0078113 A1 | 3/2011 | Franz | |

* cited by examiner

*Primary Examiner* — Robert Beausoliel, Jr.
*Assistant Examiner* — Michael Pham
(74) *Attorney, Agent, or Firm* — Scott P. Zimmerman, PLLC

(57) ABSTRACT

A method and system for implementing virtual primary keys in databases of an enterprise network system includes generating virtual primary keys indexed to respective native primary keys. An enterprise application may reference a virtual primary key in a database query. The virtual primary key may be translated to a native primary key for a database that the database query was intended for. The translated database query may be sent to the database. The query response may be translated from the native primary key to the virtual primary key, before sending back to the enterprise application.

9 Claims, 4 Drawing Sheets

SYSTEM AND METHOD FOR IMPLEMENTING UNIQUE PRIMARY KEYS ACROSS ENTERPRISE DATABASES

BACKGROUND

1. Field of the Disclosure

The present disclosure relates to enterprise databases and, more particularly, to disambiguating database keys across an enterprise.

2. Description of the Related Art

Large enterprises commonly rely upon numerous populated database systems for routine data processing tasks. Primary keys are used to identify records within a database. Each of the databases may not only have primary keys of different data types, but may have complex, multi-column primary keys as well.

DESCRIPTION OF THE EMBODIMENT(S)

Figure 1:
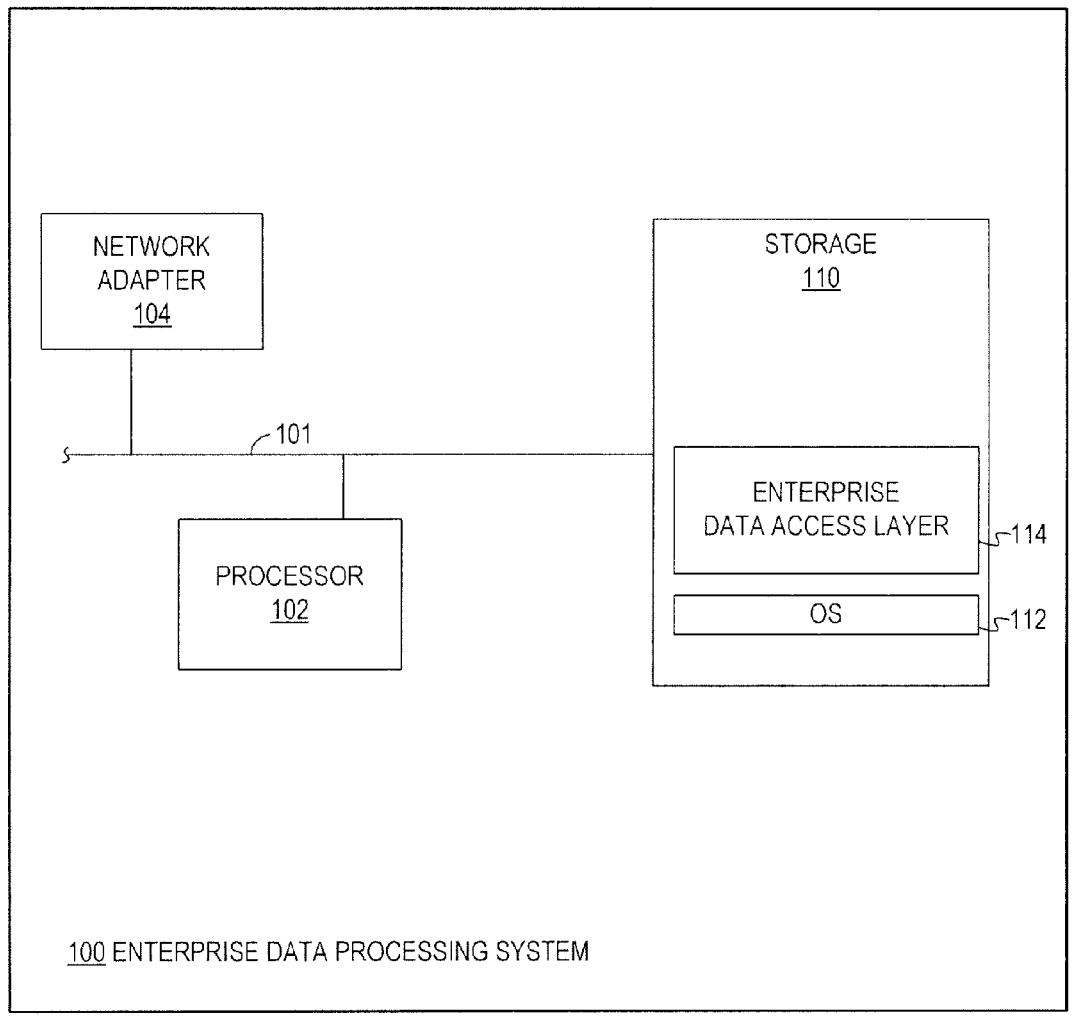
FIG. 1 is a block diagram of selected elements of an embodiment of an enterprise data processing system.

In one aspect, a disclosed method for implementing unique primary keys in an enterprise network system includes receiving a request from an enterprise application to access an enterprise database, the request including a virtual primary key. In response to sending the virtual primary key to an enterprise key translation module, the method may further include receiving a native primary key from the enterprise key translation module. Based on the native primary key, the method may further include identifying database schema stored in a data model repository and associated with the enterprise database. Based on the identified database schema, the method may still further include translating the request to include the native primary key instead of the virtual primary key.

In certain embodiments, the native primary key may include a compound primary key. The virtual primary key may consist of a unique value among databases of the enterprise network system. In certain embodiments, the virtual primary key may also include unique values to identify sub-row data elements of the databases of the enterprise network system. The method may also include sending the translated request to the enterprise database, receiving the response to the translated request from the enterprise database, and forwarding the response to the enterprise application. If the response includes an indication of the native primary key, the virtual primary key may be forwarded instead of the native primary key.

In particular embodiments, the method may further include receiving a notification from the data model repository that a new enterprise database has been added to the enterprise network system, the notification including a new native primary key of the new enterprise database. Responsive to receiving the notification, the method may include instructing the enterprise key translation module to generate a new virtual primary key mapped to the new native primary key.

In yet another aspect, an enterprise network system for implementing unique primary keys includes a data model repository, an enterprise key translation, and an enterprise data processing system. The data model repository may be configured to store database schema of enterprise databases, the database schema including native primary keys. The enterprise key translation module may be configured to manage virtual primary keys respectively mapped to the native primary keys. The enterprise data processing system may be configured to access the data model repository and the enterprise key translation module. The enterprise data processing system may further include a processor configured to access memory media, while the memory media may include instructions executable by the processor. The processor instructions may be executable to receive a request to access an enterprise database, the request including a virtual primary key, and, in response to sending the virtual primary key to the enterprise key translation module, receive a native primary key of the enterprise database from the enterprise key translation module.

In some embodiments, the native primary keys may include compound primary keys. At least one of the compound primary keys may include at least two keys with different data types. The virtual primary keys may be unique among the enterprise databases. The enterprise key translation module may be further configured to store the virtual primary keys. The virtual primary keys may be single-column primary keys.

In selected embodiments, the memory media may further include processor instructions executable to use the native primary key to access database schema of the enterprise database, and, based on the accessed database schema for the enterprise database, modify the request to include the native primary key instead of the virtual primary key. The memory media may further include processor instructions executable to send the translated request to the enterprise database for processing. The request may be received from an enterprise application executing remotely from the enterprise data processing system.

In certain embodiments, the enterprise key translation module and/or the data model repository may be implemented by processor instructions included in the memory media. In various embodiments, the memory media may further include processor instructions executable to receive a notification from the data model repository that a new enterprise database has been added to the enterprise network system, the notification including a new native primary key of the new enterprise database, and, responsive to receiving the notification, instruct the enterprise key translation module to generate a new virtual primary key mapped to the new native primary key.

In yet another aspect, disclosed computer-readable memory media include instructions for implementing unique primary keys in an enterprise network system. The instructions may be executable to receive a query request from an enterprise application to access an enterprise database, the request including a virtual primary key unique to databases in the enterprise network system. In response to sending the virtual primary key to an enterprise key translation module, the instructions may be further executable to receive a native primary key of the enterprise database from the enterprise key translation module. The instructions may also be executable to identify, based on the native primary key and information indicative of the enterprise database, database schema of the enterprise database stored on a data model repository. The instructions may still further be executable to translate, based on the identified database schema, the query request to include the native primary key instead of the virtual primary key. In certain embodiments, the virtual primary key may identify an enterprise data object that is stored in the enterprise database.

In given embodiments, the memory media may further include instructions executable to send the translated query request to the enterprise database, receive a query response to the translated query request from the enterprise database, and forward the query response to the enterprise application. If the query response includes an indication of the native primary key, the virtual primary key may be forwarded instead of the native primary key.

In certain embodiments, the memory media may further include instructions executable to receive a notification from the data model repository that a new enterprise database has been added to the enterprise network system, the notification including a new native primary key of the new enterprise database, and, responsive to receiving the notification, instruct the enterprise key translation module to generate a new virtual primary key mapped to the new native primary key. The native primary key may be a compound primary key comprising at least two keys of different data types.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of enterprise data processing system 100. In FIG. 1, enterprise data processing system 100 is shown as a functional component independent of any physical implementation. In particular, it is noted that enterprise data processing system 100 may include additional components or elements (not shown in FIG. 1) commonly used with data processing systems, such as peripheral devices, storage devices, multimedia devices, and display devices, among others.

In the embodiment depicted in FIG. 1, enterprise data processing system 100 includes processor 102 coupled via shared bus 101 to storage media collectively identified as storage 110. Enterprise data processing system 100, as depicted in FIG. 1, further includes network adapter 104 that may interface enterprise data processing system 100 to various components of an enterprise network system (see also FIG. 2).

Storage 110 encompasses persistent and volatile media, fixed and removable media, and magnetic, semiconductor, and optical media. Storage 110 is operable to store instructions, data, or both. Storage 110 as shown may include sets or sequences of instructions, namely, an operating system 112 and enterprise data access layer 114. Operating system 112 may be a UNIX or UNIX-like operating system, a Windows® family operating system, or another suitable operating system. In some embodiments, storage 110 is configured to store and execute instructions provided as services to components in an enterprise network system (see also FIG. 2). Enterprise data access layer 114 may provide functionality to implement unique virtual primary keys for accessing enterprise databases, as will be described in detail below.

Figure 2:
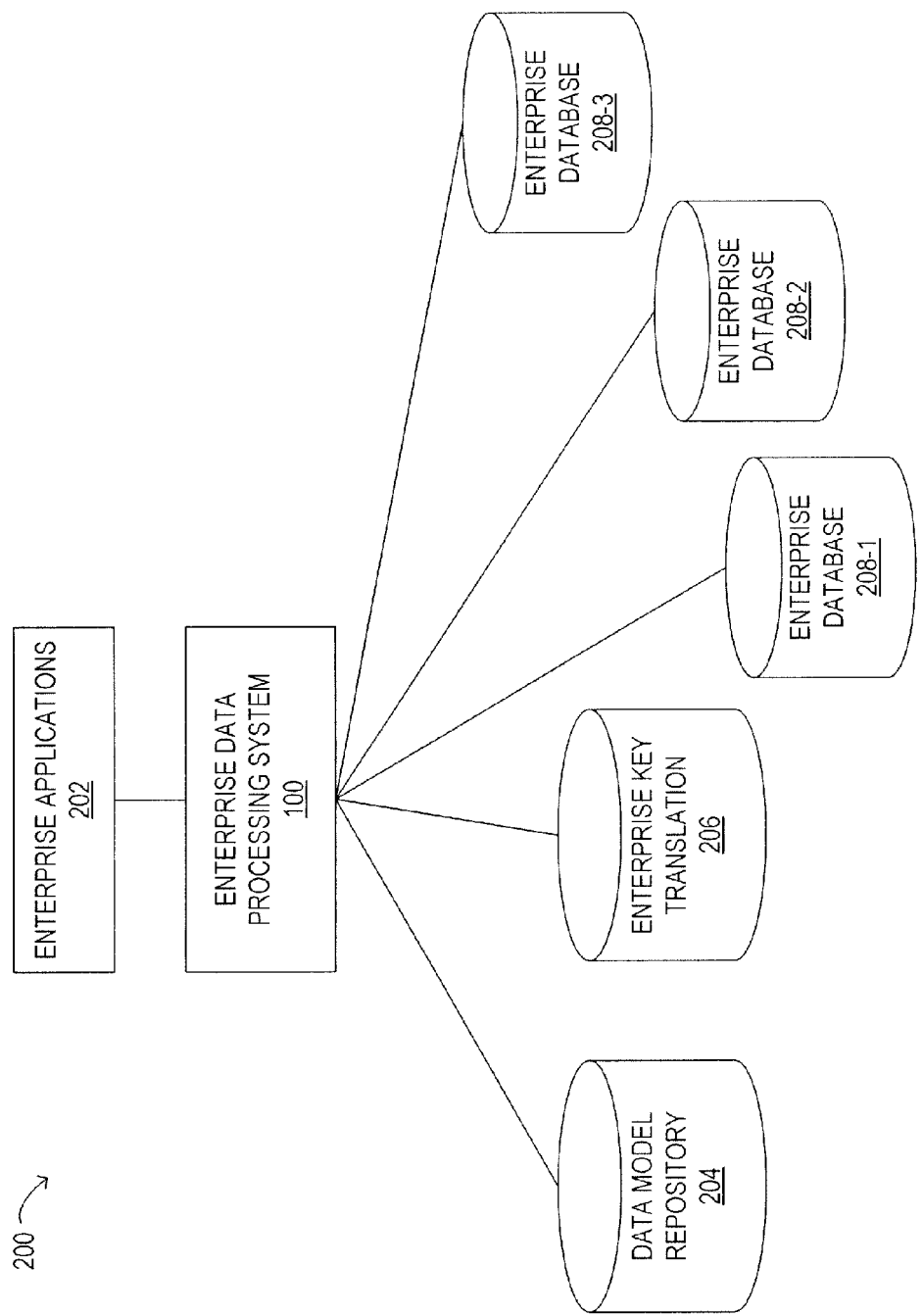
FIG. 2 is a block diagram of selected elements of an embodiment of an enterprise network system.

Turning now to FIG. 2, a block diagram of selected elements of an embodiment of enterprise network system 200 is depicted. Enterprise network system 200 may represent elements of hardware and/or software configured to provide data processing services and functionality to a large number of end users in an enterprise. Accordingly, the various elements in enterprise network system 200 may be interconnected via networking equipment and may be located at different geographic locations. Enterprise network system 200 may further include additional instances of network servers and various other pieces of network equipment not explicitly illustrated in FIG. 2.

In enterprise network system 200, enterprise data processing system 100 is also shown with access to a number of functional elements, which may include storage and program execution functionality. Enterprise network system 200 is shown including enterprise data processing system 100 (see also FIG. 1), which, as shown, is coupled to enterprise applications 202, data model repository 204, enterprise key translation 206, and a number of enterprise databases 208, represented by exemplary instances 208-1, 208-2, and 208-3. In particular, the data processing functionality provided by enterprise network system 200, as depicted in FIG. 2, may include implementing virtual primary keys, as described herein.

In FIG. 2, enterprise applications 202 may represent a number of different applications in use within enterprise network system 200, and may represent applications at various locations within enterprise network system 200. It is noted that enterprise applications 202 may be operated by a plurality of enterprise users using enterprise client systems (not shown in FIG. 2). In certain instances, enterprise applications 202 may represent applications operable, at least in part, by entities external to enterprise network system 200, for example, members of the general public via a public network, such as the Internet.

As mentioned above, enterprise data processing system 100 may be configured to access a number of enterprise databases 208. Enterprise databases 208 may include functionality for processing instructions, such as processing database queries to generate query results based on the contents stored in a database. While in FIG. 2, three example instances of enterprise databases 208 are shown for clarity, namely 208-1, 208-2 and 208-3, it will be understood that enterprise network system 200 may include a large plurality of different types and configurations of enterprise databases 208. In certain embodiments, enterprise databases 208 may be embodied by specialized enterprise network servers, either physical or virtualized, which provide database services accessible within enterprise network system 200. In some embodiments, enterprise databases 208-1, 208-2 and 208-3 may be implemented on a common hardware platform, yet be configured to execute different database applications storing differing data content. The databases provided by enterprise databases 208 may be relational databases, object databases, streaming databases, or other types of databases. In enterprise network system 200, enterprise applications 202 may be configured to access at least one of enterprise databases 208 for storing and retrieving data and information to implement a variety of enterprise functions.

In particular embodiments, enterprise databases 208 may include structured relational databases including tables indexed by primary keys (not shown in FIG. 2), which may be native primary keys. As used herein, a "native primary key" refers to at least one primary key that is unique within a local database system, but is not unique or coordinated with external database systems. A native primary key may be a compound primary key, comprising more than one key value from at least one table. A compound primary key may combine key values having different data types, such as a string and a numerical value. In certain embodiments, while values of a native primary key may contain business data, the corresponding virtual primary key may be used to shield or otherwise mask such business data from being used as a key within enterprise applications 202. It is noted that a native primary key may not be unique among enterprise databases 208 of enterprise network system 200. For example, enterprise database 208-1 may be configured with a first native primary key and enterprise database 208-2 may be configured with a second native primary key. Since enterprise databases 208-1 and 208-2 may have been implemented independently of each other, in certain instances, the first native primary key and the second native primary key may be similar or even identical. While this kind of database configuration may be operable and accessible by enterprise applications 202, it may be problematic from an enterprise data management perspective. Confusion and errors may exist, for example, if one of enterprise applications 202 accesses both enterprise databases 208-1 and 208-2. Certain associated program code referring to enterprise databases 208-1 and 208-2 may contain ambiguous code elements, which may be unnecessarily time consuming to resolve to either the first native primary key or the second native primary key. Such ambiguity may substantially affect development, installation, and testing of code for enterprise applications 202 in a negative manner. Furthermore, maintenance and optimization of enterprise databases 208 having native primary keys, which may represent a considerable ongoing effort in a large enterprise, may become unmanageable and constrain the flexibility of the enterprise to change or grow. Accordingly, enterprise network system 200 may experience various disadvantages, which may increase with increasing size and complexity of enterprise network system 200, when enterprise databases 208 are implemented with native primary keys.

In FIG. 2, enterprise data processing system 100 may further be configured to access enterprise key translation 206. Enterprise key translation 206 may manage and may store unique "virtual primary keys" indexed to native primary keys for enterprise databases 208. As used herein, a "virtual primary key" is an enterprise primary key generated by enterprise key translation 206 and usable by enterprise applications 202 to refer to enterprise databases 208. Since virtual primary keys may consist of unique values among enterprise databases 208, a virtual primary key may be a single-column primary key having a single data type. In certain embodiments, a virtual primary key may also include unique values to identify sub-row data elements of the enterprise databases. In various embodiments, a virtual primary key may consists of a unique value among enterprise databases 208 in enterprise network system 200.

In enterprise network system 200, enterprise key translation 206 may provide various functionality associated with virtual primary keys. When a new one of enterprise databases 208 is created in enterprise network system 200, enterprise key translation 206 may generate a new virtual primary key indexed to a native primary key of the new database. Enterprise key translation 206 may generate new virtual primary keys in response to receiving an indication from enterprise data processing system 100 and/or from data model repository 204. Enterprise key translation 206 may be configured to provide a virtual primary key in response to receiving a request indicating a native primary key. Furthermore, enterprise key translation 206 may provide a native primary key in response to receiving a request indicating a virtual primary key. Enterprise key translation 206 may be configured to provide database key translation services, as described above, to various entities within enterprise network system 200.

In FIG. 2, enterprise data processing system 100 may also be configured to access data model repository 204, which may store database schema (i.e., database descriptions) (not shown in FIG. 2) for a number of enterprise databases 208. The database schema may include a description of at least one native primary key for tables in the database schema. Data model repository 204 may be configured to disambiguate native primary keys with secondary information, and may further be configured to automatically adapt database schema when changes are made to underlying enterprise databases 208. Accordingly, data model repository 204 may notify enterprise key translation 206 when a change in a native primary key has taken place.

In operation of enterprise network system 200, a new one of enterprise databases 208 may be configured in enterprise network system 200 for a new one of enterprise applications 202. The new one of enterprise databases 208 may be configured with a native primary key. A message may be sent to enterprise key translation 206, indicating that a new native primary key has been introduced into enterprise network system 200. In response, enterprise key translation 206 may generate a new virtual primary key indexed to the new native primary key. In certain embodiments, data model repository 204 may send the message indicating that the new one of enterprise databases 208 has been added to enterprise network system 200.

In further operation of enterprise network system 200, one of enterprise applications 202 may issue a database query using a virtual primary key. For example, the database query may be directed towards enterprise database 208-3. Enterprise data processing system 100 may handle the database query and send a request for a native primary key for enterprise database 208-3 corresponding to the virtual primary key in the received database query to enterprise key translation 206. Enterprise key translation 206 may then respond with the native primary key and with information indicative of enterprise databases 208, which enterprise data processing system 100 may use to query data model repository 204 for the database schema of enterprise database 208-3. The database schema may be received by enterprise data processing system 100. Enterprise data processing system 100 may then, using the database schema, translate the database query to use the native primary key, and send the translated database query to enterprise database 208-3. In further embodiments, a virtual primary key may index certain content of enterprise database 208 (for example, a data object) and shield information about enterprise database 208, which stores the indexed content, from enterprise applications 202. Enterprise data processing system 100 may then be used to direct a virtual data object access identified by a virtual primary key to the respective enterprise database 208, as indicated by enterprise key translation 206 and data model repository 204.

Still further, enterprise data processing system 100 may receive a query response from enterprise database 208-3 to the translated database query, which may include values and/or an indication associated with the native primary key. Enterprise data processing system 100 may then translate the query response to use the virtual primary key instead of the native primary key. Enterprise data processing system 100 may then send the translated query response to the one of enterprise applications 202 issuing the database query. The one of enterprise applications 202 may remain unaware of the operations performed by enterprise data processing system 100, which may be performed automatically and not involve any user interaction to translate between the virtual primary key and the native primary key.

Figure 3:
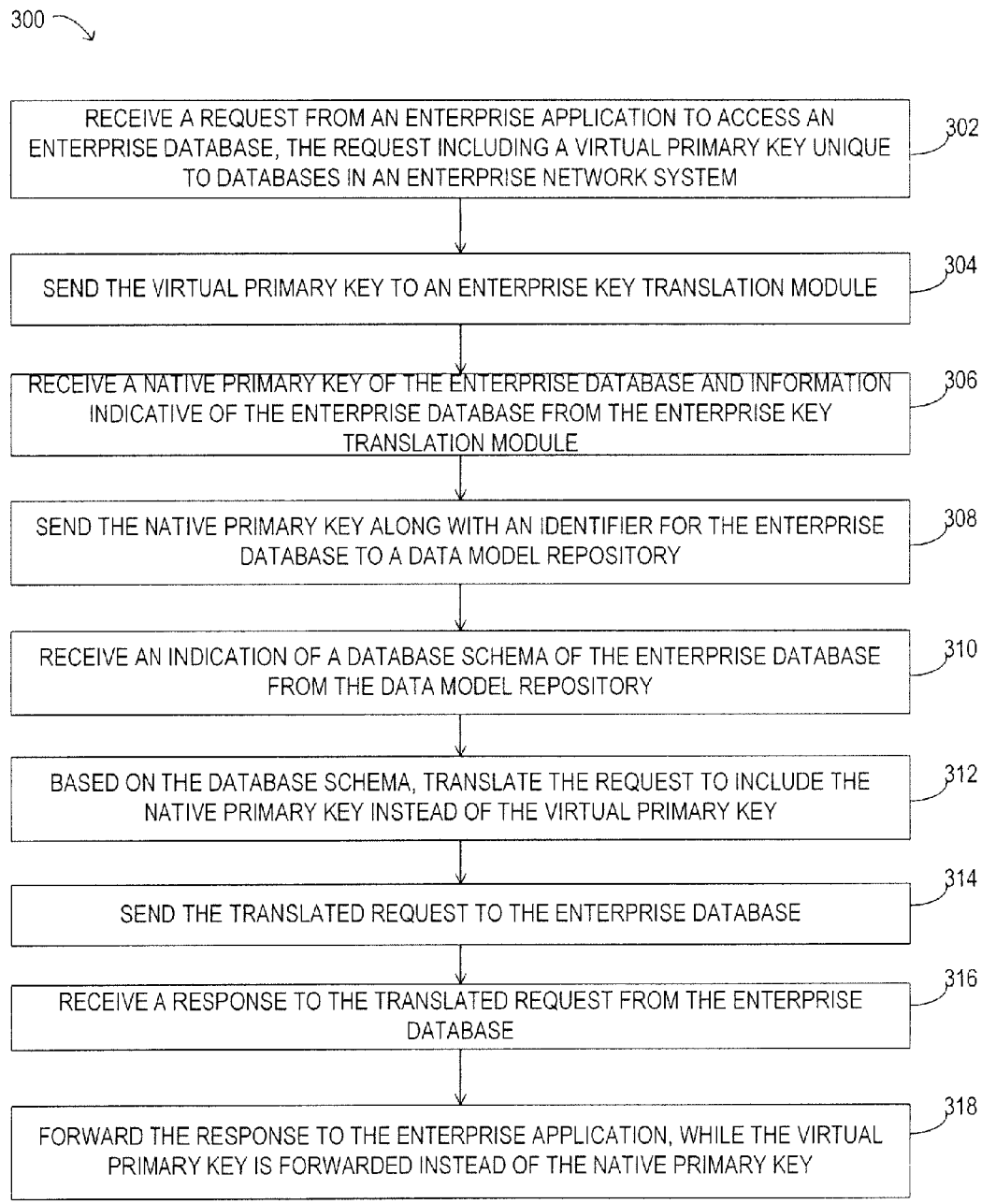
FIG. 3 illustrates an embodiment of a method for implementing enterprise primary keys.

Turning now to FIG. 3, an embodiment of method 300 for implementing virtual primary keys is illustrated. In one embodiment, method 300 is performed by enterprise data access layer 114 executing on enterprise data processing system 100 (see FIG. 1). Method 300 may also be performed in conjunction with functionality provided by various elements in enterprise network system 200 (see FIG. 2). It is noted that certain operations described in method 300 may be optional or may be rearranged in different embodiments.

Method 300 may begin with receiving a request from an enterprise application to access an enterprise database, the request including a virtual primary key unique to databases in an enterprise network system (operation 302). The virtual primary key may be sent to an enterprise key translation module (operation 304). A native primary key of the enterprise database and information indicative of the enterprise database may be received from the enterprise key translation module (operation 306). The native primary key may be sent, along with an identifier for the enterprise database, to a data model repository (operation 308). An indication of a database schema of the enterprise database may be received from the data model repository (operation 310). Based on the database schema, the request may be translated to include the native primary key instead of the virtual primary key (operation 312). The translated request may be sent to the enterprise database (operation 314). A response to the translated request may be received from the enterprise database (operation 316). When the original request in operation 302 represents a database query, the response in operation 316 may be a corresponding query response to the database query, and may include an indication of the native primary key. The response may then be forwarded to the database application, while the virtual primary key is forwarded instead of the native primary key (operation 318).

Figure 4:
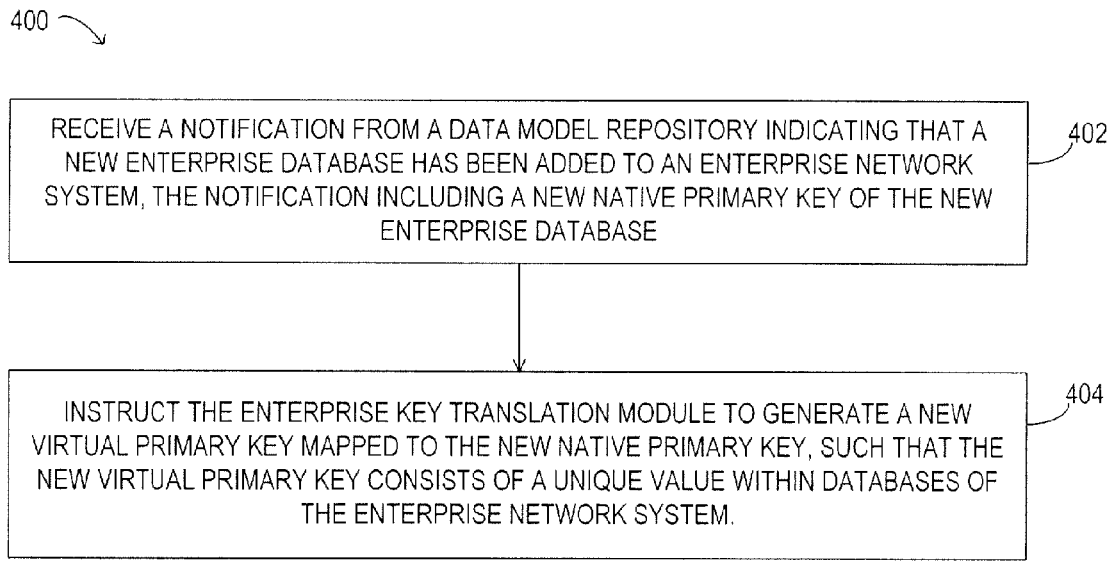
FIG. 4 illustrates an embodiment of a method for implementing enterprise primary keys.

Turning now to FIG. 4, an embodiment of method 400 for implementing virtual primary keys is illustrated. In one embodiment, method 400 is performed by enterprise data access layer 114 executing on enterprise data processing system 100 (see FIG. 1). Method 400 may also be performed in conjunction with functionality provided by various elements in enterprise network system 200, such as enterprise key translation 206 (see FIG. 2). It is noted that certain operations described in method 400 may be optional or may be rearranged in different embodiments. A notification from a data model repository may be received indicating that a new enterprise database has been added to an enterprise network system, the notification including a new native primary key of the new enterprise database (operation 402). The enterprise key translation module may then be instructed to generate a new virtual primary key mapped to the new native primary key, such that the new virtual primary key consists of a unique value within databases of the enterprise network system (operation 404). It will be noted that method 400 may be implemented on existing enterprise databases. Once implemented on existing enterprise database, method 400 may be used to maintain these existing databases in response to the addition of new native primary key values for new data records within such databases.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for implementing keys in an enterprise network system, the method comprising:
   receiving a database query sent from a database application to an enterprise server, the database query comprising a virtual key corresponding to a primary key that is identical to different databases in an enterprise system;
   storing a key translation table in memory of the enterprise server, the key translation table mapping different primary keys to different virtual keys, each one of the different virtual keys uniquely identifying one of the different databases in the enterprise system with a single-column having a single data type;
   querying the key translation table for the primary key corresponding to the database query;
   retrieving one of the different virtual keys from the key translation table that maps to the primary key;
   translating the database query into a translated database query that replaces the virtual key with the one of the different primary keys;
   sending the translated database query from the enterprise server to the one of the different databases uniquely identified by the one of the different virtual keys;
   receiving, at the enterprise server, a database response to the translated database query;
   translating the database response into a translated response that replaces the one of the different primary keys with the virtual key; and
   sending the translated response from the enterprise server to the database application in response to the database query.

2. The method of claim 1, wherein the primary key comprises a compound primary key.

3. The method of claim 1, further comprising storing a new virtual key in the key translation table that uniquely identifies a new database in the enterprise system.

4. A system, comprising:
   a server; and
   a memory storing code that when executed causes the processor to perform operations, the operations comprising:
   receiving a database query sent from a database application, the database query comprising a virtual key corresponding to a primary key that is identical to different databases in an enterprise system;
   storing a key translation table that maps primary keys to virtual keys, each one of the virtual keys uniquely identifying one of the different databases in the enterprise system with a single-column having a single data type;
   querying the key translation table for the primary key corresponding to the database query;
   retrieving one of the virtual keys from the key translation table that maps to the primary key;
   translating the database query into a translated database query that replaces the virtual key with the one of the primary keys;
   sending the translated database query to the one of the different databases uniquely identified by the one of the virtual keys;
   receiving a database response to the translated database query;
   translating the database response into a translated response that replaces the one of the primary keys with the virtual key; and
   sending the translated response to the database application in response to the database query.

5. The system of claim 4, wherein the operations further comprise storing a new virtual key in the key translation table that uniquely identifies a new database in the enterprise system.

6. The system of claim 4, wherein the operations further comprise receiving a change notification that the primary key has changed.

7. The system of claim 4, wherein the operations further comprise receiving a new database message identifying a new primary key of a new database in the enterprise system.

8. A memory storing instructions that when executed cause a processor to perform operations, the operations comprising:
   receiving a database query from a database application, the database query comprising a primary key that is identical to different databases in an enterprise system;
   storing a key translation table that maps primary keys to virtual keys, each one of the virtual keys uniquely identifying one of the different databases in the enterprise system with a single-column having a single data type;
   querying the key translation table for the primary key corresponding to the database query;
   retrieving the one of the virtual keys from the key translation table that maps to the primary key;
   translating the database query into a translated database query that replaces the one of the virtual keys with the primary key;
   sending the translated database query to the one of the different databases uniquely identified by the one of the virtual keys;
   receiving a database response to the translated database query;
   translating the database response into a translated response that replaces the primary key with the one of the virtual keys; and
   sending the translated response to the database application in response to the database query.

9. The memory of claim 8, wherein the operations further comprise receiving a new database message identifying a new primary key of a new database in the enterprise system.

* * * * *